US009304029B2

(12) United States Patent
Guzman et al.

(10) Patent No.: US 9,304,029 B2
(45) Date of Patent: Apr. 5, 2016

(54) LEVEL GAUGING SYSTEM FOR LONG NARROW NOZZLES

(71) Applicant: Rosemount Tank Radar AB, Gotebrog (SE)

(72) Inventors: Oscar Guzman, Molndal (SE); Ilya Rikhter, Gothenburg (SE)

(73) Assignee: Rosemount Tank Radar AB, Gothenburg (SE)

( * ) Notice: Subject to any disclaimer, the term of this patent is extended or adjusted under 35 U.S.C. 154(b) by 211 days.

(21) Appl. No.: 14/230,574

(22) Filed: Mar. 31, 2014

(65) Prior Publication Data

US 2015/0276461 A1 Oct. 1, 2015

(51) Int. Cl.
 *G01F 23/00* (2006.01)
 *G01F 23/28* (2006.01)
 *G01F 23/284* (2006.01)

(52) U.S. Cl.
 CPC .................... *G01F 23/284* (2013.01)

(58) Field of Classification Search
 None
 See application file for complete search history.

(56) References Cited

U.S. PATENT DOCUMENTS

| 5,263,371 | A | 11/1993 | Maresca, Jr. et al. |
| 5,564,305 | A | 10/1996 | Cadeo |
| 5,950,487 | A | 9/1999 | Maresca, Jr. et al. |
| 6,690,320 | B2 | 2/2004 | Benway et al. |
| 7,161,165 | B2 | 1/2007 | Wirthlin |
| 7,342,531 | B2 * | 3/2008 | Hagg ...................... G01F 23/18 324/629 |
| 7,525,476 | B1 * | 4/2009 | Delin .................... G01S 7/4056 324/600 |
| 7,586,435 | B1 * | 9/2009 | Edvardsson .......... G01F 23/284 324/600 |
| 7,636,059 | B1 * | 12/2009 | Edvardsson .......... G01F 23/284 342/124 |
| 7,997,132 | B2 | 8/2011 | Ross, Jr. et al. |
| 8,085,187 | B2 * | 12/2011 | Gard ..................... G01F 23/284 342/124 |
| 8,096,177 | B2 * | 1/2012 | Burris ................. G01F 23/2962 73/290 R |

(Continued)

FOREIGN PATENT DOCUMENTS

| CA | 2 215 626 | 3/2000 |
| EP | 1 524 506 | 4/2005 |
| WO | WO 2010/064023 | 6/2010 |

OTHER PUBLICATIONS

Rosemount Process Level Guided Wave Radar and Vibrating Fork Switches, Mar. 2009, 4 pgs.

(Continued)

*Primary Examiner* — Peter Macchiarolo
*Assistant Examiner* — Jermaine Jenkins
(74) *Attorney, Agent, or Firm* — Westerman, Champlin & Koehler, P.A.

(57) ABSTRACT

A gauging installation for a tank with a long narrow nozzle providing access to an interior of the tank. The gauging system includes a GWR level gauge with a probe, and a first rigid extension member providing an interior probe mounting position at the end of the nozzle. The probe is configured to guide an electromagnetic transmit signal from a transceiver towards the product inside the tank, and to return the electromagnetic echo signal resulting from a reflection of the electromagnetic transmit signal by a surface of the product. A microwave transmission line connects the transceiver and the probe.
With this design the beginning of the probe of the GWR level gauge will be located at the lower end of the nozzle, i.e. at the upper interior of the tank.

35 Claims, 4 Drawing Sheets

(56) References Cited

U.S. PATENT DOCUMENTS

| | | | |
|---|---|---|---|
| 8,171,786 B2* | 5/2012 | Burris | G01F 23/2962 |
| | | | 73/290 V |
| 8,251,130 B2 | 8/2012 | Ogasawara et al. | |
| 2007/0090992 A1* | 4/2007 | Edvardsson | G01F 23/284 |
| | | | 342/124 |
| 2009/0178478 A1 | 7/2009 | Reimelt et al. | |
| 2014/0022112 A1 | 1/2014 | Pichot | |
| 2014/0028492 A1 | 1/2014 | Mayer et al. | |

OTHER PUBLICATIONS

Product Data Sheet 00813-0100-4530, Rev BA, Rosemount 5300 Series, Superior Performance Guided Wave Radar Level and Interface Transmitter, May 2009.

Vegaflex 80 Guided-Wave Radar from VEGA Automates Level and Interface Measurement, dated Jan. 15, 2013, 2 pgs.

Communication from European Patent Application No. 15160125.9, dated Sep. 14, 2015.

* cited by examiner

LEVEL GAUGING SYSTEM FOR LONG NARROW NOZZLES

FIELD OF THE INVENTION

The present invention relates to a gauging system comprising a radar level gauge and a method using electromagnetic waves to determine a distance to a surface of a product in a tank.

BACKGROUND OF THE INVENTION

In some tank applications, access to the tank is provided through a relatively long (e.g. 2-3 m) and narrow (e.g. 5-10 cm) nozzle. One such application is underground storage tanks, which are used for storing liquid products in a very cold environment.

In order to monitor the filling level in such tanks, a conventional float or level switch is typically used. While providing some information about the filling level, such as when a critical level is exceeded, such level switches cannot provide reliable information about the filling level.

Attempts have been made to employ a guided wave radar (GWR) level gauge to provide filling level information. A GWR level gauge includes a transmission line (probe) extending into the tank, for guiding electromagnetic transmit signals and returning a reflection from an interface between tank atmosphere and product in the tank. However, is difficult to obtain reliable measurements due to interference caused by the long nozzle. Also, temperature gradients along the nozzle, typically extending from an underground level up to ground level, may cause condensation along the probe causing further interference.

U.S. Pat. No. 6,690,320 discloses a system attempting to solve some of these issues by confining the probe within a coaxial extension down to a position below the nozzle. Hereby, the electromagnetic field propagating along the probe is not affected by the nozzle, and the result is the same as if the probe had been installed below the nozzle.

However, the solution in U.S. Pat. No. 6,690,320 does not overcome the problem of temperature gradients causing condensation and possibly ice along the probe in the nozzle.

Also, in some situations the difficulty of containing and cleaning any underground leakage makes it extremely important to prevent any overfill condition. Any gauging system provided in such a tank must therefore be sufficiently robust.

GENERAL DISCLOSURE OF THE INVENTION

With regards to the above-mentioned desired properties of a gauging system, it is a general object of the present invention to enable improved performance of a gauging system by alleviating the interference from a long narrow nozzle, and to provide a gauging system with increased safety.

According to a first aspect of the present invention, these and other objects are achieved by a gauging installation in a tank for holding liquids, comprising a nozzle providing access to an interior of the tank, the nozzle having a tank end connected to an opening in a tank wall, and a distal end at a distance from the tank, the distance being greater than 0.5 meter, and a gauging system. The gauging system includes a tank seal arranged in the distal end of the nozzle and configured to separate a tank interior from a tank exterior, a first rigid extension member extending from the tank seal and providing an interior probe mounting position located proximal to the tank end of the nozzle, and a guided wave radar level gauge for measurement of a distance to a surface of a product in the tank. The guided wave radar level gauge includes a transceiver configured to transmit an electromagnetic transmit signal and to receive an electromagnetic echo signal, a processing circuitry connected to the transceiver and configured to determine the distance based on a relationship between the electromagnetic transmit signal and the electromagnetic echo signal, a probe mounted in the probe mounting position and extending into the tank, the probe configured to guide the electromagnetic transmit signal from the transceiver towards the product inside the tank, and to return the electromagnetic echo signal resulting from a reflection of the electromagnetic transmit signal by a surface of the product, a microwave transmission line having a first end connected to the transceiver; and a probe sealing arrangement providing a sealed connection of the probe to a second end of the transmission line.

According to a second aspect of the present invention, these and other objects are achieved by a gauging system, intended to be mounted in a tank nozzle having a length of at least 0.5 meter, the gauging system comprising a tank seal configured to be mounted in an upper opening of the nozzle, the tank seal configured to separate a tank interior from a tank exterior, a first rigid extension member extending from the tank seal and providing an interior probe mounting position at a distance from the tank seal, the first extension member having a length of at least 0.5 meter, and a guided wave radar level gauge for measurement of a distance to a surface of a product in the tank. The guided wave radar level gauge includes a transceiver configured to transmit an electromagnetic transmit signal and to receive an electromagnetic echo signal, processing circuitry connected to the transceiver and configured to determine the distance based on a relationship between the electromagnetic transmit signal and the electromagnetic echo signal, a probe mounted in the probe mounting position and configured to guide the electromagnetic transmit signal from the transceiver towards the product inside the tank, and to return the electromagnetic echo signal resulting from a reflection of the electromagnetic transmit signal by a surface of the product, a microwave transmission line having a first end connected to the transceiver, and a probe sealing arrangement providing a sealed connection of the probe to a second end of the transmission line.

The present invention is based upon the realization that it is possible to attach the probe of a guided wave radar level gauge in a probe mounting position close to the interior end of a nozzle by mounting it to a rigid extension member. A microwave transmission line connects the probe to the transceiver via a sealed probe connection. With this design, the probe will not be exposed to any temperature gradients, condensation and ice in the nozzle.

The microwave transmission line may have has an impedance which is matched to the transceiver and/or to the probe in order to minimize interference.

In addition to the radar level gauge, the gauging system may comprise a level switch, e.g. to provide a redundant overfill detection. By "level switch" is intended any device capable of detecting if the surface exceeds a given filling level. In one embodiment, the level switch comprises a surface detector arranged in the tank interior and configured to detect the surface, and provide a measurement signal indicative of the surface, a control unit arranged in the tank exterior and configured to receive the measurement signal and, based on the measurement signal, determine if the surface has exceeded a predetermined filling level, an electrical connection line arranged to the control unit, and a detector sealing arrangement providing a sealed connection of the surface detector to a second end of the electrical connection line. The transceiver, the processing circuitry and the control unit may be housed in one single electronics unit.

The surface detector may be any known interface or contact detector such as a capacitive sensor or acoustic or mechanical resonator. By providing a measurement signal which is indicative of the surface it should be understood that a signal is either generated or altered as a result of presence of the surface.

The surface detector may be is mounted in the probe mounting position, and the first rigid extension member is thus used to suspend also the surface detector. Alternatively, the gauging installation further comprises a second rigid extension member extending from said tank seal to provide an interior detector mounting position, and the surface detector is mounted in this interior detector mounting position. The detector mounting position may be located above the probe mounting position, enabling the level switch to provide an added safety by measuring contact with the surface above an active detection zone of the guided wave radar level gauge. By enabling both level measurement using guided wave radar level gauging and surface detection by contact through a long narrow nozzle, an increased safety is provided through the two separate measurements.

Alternatively, the detector mounting position may be located below the probe mounting position, so that the level switch is active inside the active detection zone of the guided wave radar level gauge.

The first and/or second rigid extension members may be tubular, so that the transmission line and/or the electrical connection line may be arranged inside the tubular members. A tubular member may be sealed by the probe sealing arrangement, so as to provide a passage for the microwave transmission line which is protected from the tank content.

A support element may be arranged to maintain at least a predetermined distance between the extension members and the nozzle inner wall, as well as between the extension members. Such a support element may prevent damage to the extension members.

It may also be advantageous to provide a temperature sensor, arranged to detect a temperature in a position somewhere along the first rigid extension member, i.e. somewhere in the nozzle. Such information may be used to even further improve the level measurement.

The invention is particularly advantageous for use when tanks are submerged underground, with long (typically greater than 1 meter) nozzle extending through the ground. However, also other applications with long nozzles are possible.

According to a further aspect of the present invention, the objectives are also achieved by a method for measuring a distance to a surface of a product in a tank, the tank having a nozzle with a tank end connected to an opening in a tank wall, and a distal end, wherein a distance between the tank end and the distal end is greater than 0.5 m. The method comprises the steps of feeding an electromagnetic transmit signal from a transceiver through a tank seal mounted in the distal end of the nozzle, guiding the electromagnetic transmit signal along a microwave transmission line from the tank seal to a probe mounted in a probe mounting position proximal to the tank end of the nozzle, feeding the electromagnetic transmit signal through a probe sealing arrangement to the probe extending into the tank, guiding the electromagnetic transmit signal along the probe, returning an electromagnetic echo signal resulting from a reflection of the electromagnetic transmit signal by a surface of the product, receiving the electromagnetic echo signal in the transceiver, and determining the distance based on a relationship between the electromagnetic transmit signal and the electromagnetic echo signal.

The effects, features and advantages of this second aspect of the present invention are largely analogous to those described above in connection with the first aspect of the invention. Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an embodiment of the invention.

DETAILED DESCRIPTION OF THE PREFERRED EMBODIMENTS

Figure 1:
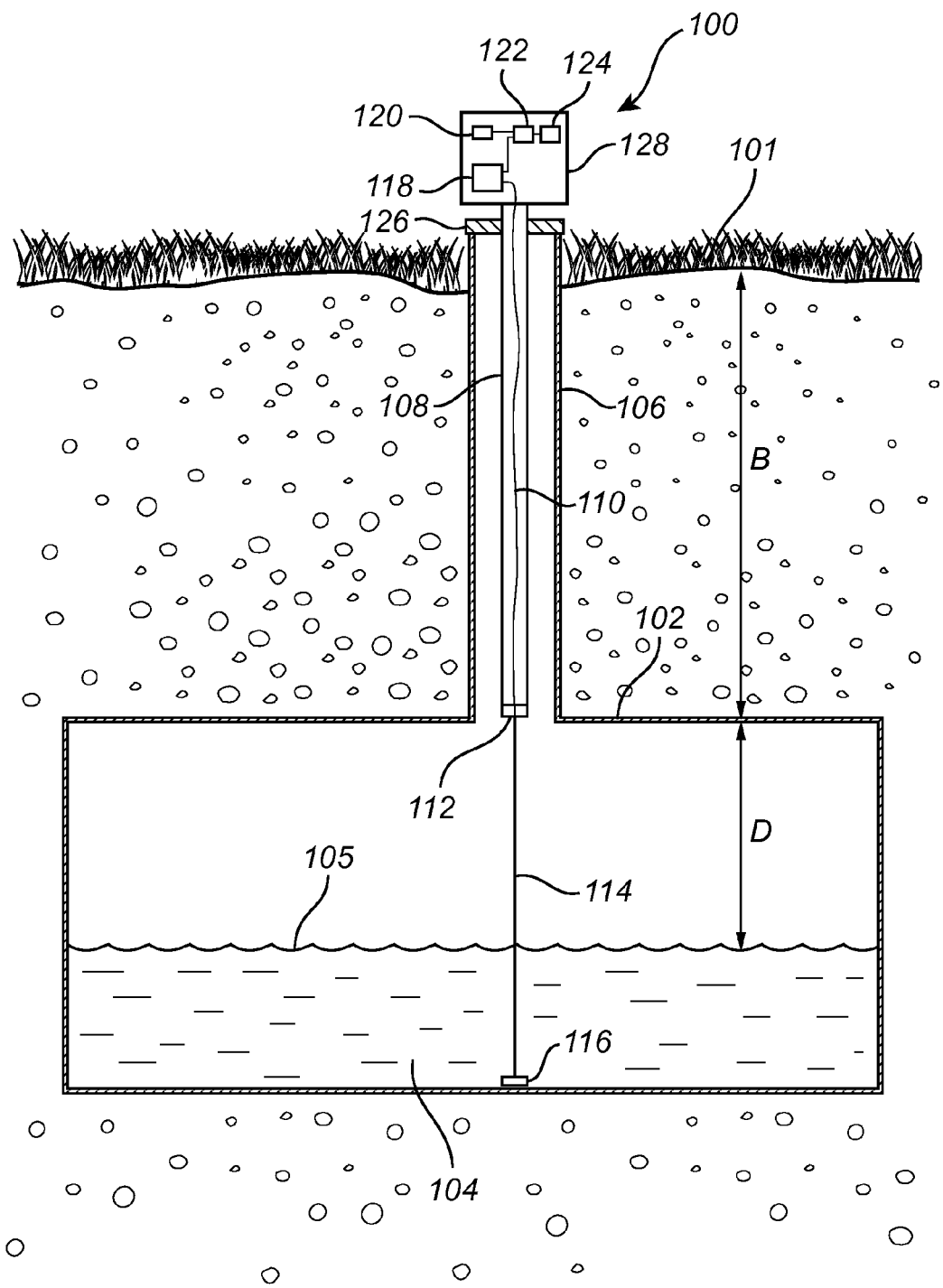
FIG. 1 is a schematic representation of a gauging system according to a first embodiment of the present invention.

In FIG. 1 a gauging system 100 according to the present invention is mounted on a nozzle 106 of a tank 102 submerged underground. The tank 102 may be any container or vessel capable of containing a liquid product, and may be metallic, or partly or even completely non-metallic. The tank 102 is buried a distance B from the ground surface 101, the distance B being typically more than one meter, and for example 2-3 m. The nozzle 106 extends from the top of the tank 102 up to above ground surface, and is thus at least as long as the distance B. The nozzle 106 is relatively narrow, and as an example the inner diameter of the nozzle 106 may be about 4 inches or less. It is noted that the invention is also suitable in other applications where level is detected through long, narrow nozzles.

A liquid product 104 is stored within the tank 102, and partly fills the tank 102 such that there is a surface 105 of the product 104 a distance D from the tank ceiling. Above the surface 105 there is a tank atmosphere typically comprising air and vaporized product. For some highly flammable products the tank atmosphere may be controlled and e.g. comprise a lower oxygen content or the like.

The gauging system 100 comprises a guided wave radar level gauge for measuring the distance D to the surface 105 of the product 104 in the tank 102. By measuring this distance, it is possible to determine the filling level, i.e. the distance from the bottom of the tank to the surface. The guided wave radar level gauge includes a measurement electronics unit 128 mounted on top of the nozzle 106. Arranged within the measurement electronics unit 128 there is a transceiver 118 configured to transmit an electromagnetic transmit signal, and to receive an electromagnetic echo signal. The "transceiver" may be one functional unit capable of transmitting and receiving electromagnetic signal, or may be a system comprising separate transmitter and receiver units.

The transceiver 118 is connected through a microwave transmission line 110 to a probe 114 arranged to guide electromagnetic transmit signals from the transceiver 118 towards the product 104 inside the tank 102, and to return electromagnetic echo signals resulting from a reflections of the electromagnetic transmit signals by a surface 105 of the product 104.

Several types of probes, for example single-line (Goubau- or Sommerfeld-type), and twin-line probes may be used. The probes may be essentially rigid or flexible and they may be made from metal, such as stainless steel, plastic, such as PTFE, or a combination thereof. However, any waveguide such as a still pipe, a transmission line, twin-line probe or a coaxial probe may be used in conjunction with the present invention.

The probe 114 preferably extends as far into the tank as required to measure a desired filling level. Therefore, a probe 114 may extend and be mechanically connected i.e. attached, for example as indicated by the end-of-probe element 116 to the bottom of the tank 102 for mechanical stability and ability to measure filling level all the way to the bottom or the tank 102. Alternatively, the probe 114 is not securely attached to the bottom, and the end-of-probe element 116 may instead be a weight to stabilize the probe 114.

According to the illustrated embodiment of the invention, a first rigid extension member, here a tubular member in the form of a cylindrical metal tube 108, extends from the electronics unit 128 through the nozzle 106 into the tank 102. The probe 114 is attached in an interior probe mounting position in the tank interior end of this tube 108 and the microwave transmission line 110 connecting the transceiver 118 and the probe 114 is arranged within the tube 108. In order to seal the transmission line 108 from the tank content there is a probe sealing 112 arranged in the interior end of the tube 108. The sealing 112 prevents tank content e.g. the liquid product 104 or the tank atmosphere from entering the tube 108.

The sealing 112 may for example be provided as a threaded plastic plug, fitted into a matching threading in the interior end of the tube 108. Another example would be a sealing 112 which is clampably attachable to the tube 108. Further, there is an electrical connection through the sealing 112 in order to allow a microwave electromagnetic signal from the microwave transmission line 110 to be guided to the probe 114. The connection may for example be a coaxial line through a PTFE plug. In case of pressurized tank content, the probe sealing 112 must be able to withstand the pressure within the tank 102 in order to ensure sealing of the tube 108.

To seal the tank 102 from the outside environment above the surface of the ground 101 there is a feed through structure 126 mounted in the upper part of the nozzle 106. The feed through structure 126 includes a tank seal which provides a sealed passage for the tube 108, thereby enabling the tube 108 to be sealingly connected to the measurement electronics unit 128.

The guided wave radar level gauge further comprises processing circuitry 122 arranged in the measurement electronics unit 128 and connected to the transceiver 118. The processing circuitry 122 is configured to determine the distance D, and thereby the filling level, based on a relationship between the electromagnetic transmit signal and the electromagnetic echo signal. The processing circuitry 122 is further connected to a memory 120 and an interface 124 for communication.

In use, the processing circuitry 122 controls the transceiver 118 to generate and transmit an electromagnetic signal. The signal will be guided by the microwave transmission line 110 to the probe 114, and by the probe towards the product 104.

Due to the impedance transition caused by the different materials i.e. dielectric constants of the tank atmospere and the product 104, a portion of the electromagnetic signal vill be reflected by the surface 105 of the product 104. The reflected portion will be received by the transceiver 118, and then by the processing circuitry 122. Then, by analyzing the received signal, the processing circuitry 122 can determine the distance between a reference position (such as the tank ceiling or the start of the probe 114) and the surface 105 of the product 104, whereby the filling level can be deduced. It should be noted that, although a tank 102 containing a single product 104 is discussed herein, the distance to any material interface along the waveguide can be measured in a similar manner.

It is noted that the level gauge may operate according to different principles of radar level gauging, i.e. as a Time-Domain Reflectometry sweep (TDR) or as Frequency Modulated Continuous Wave sweep (FMCW) using a stepped or at least sampled FMCW. Radar level gauging using FMCW and TDR are not further elaborated on herein but are well known to the person skilled in the art.

The processing circuitry 122 is further connectable to external communication lines for analog and/or digital communication via an interface 124. As an example, the communication between the communication interface 124 and an external control station (not shown) can be provided by a two-wire interface, which has a combined function of both transmitting the measurement result to the control station and receiving power for operation of the system 100. Such a two-wire interface may provide a more or less constant power, and the measurement result can be superimposed on the power voltage using a digital protocol, such as Fieldbus Foundation or HART. Alternatively, the current in the lines is regulated in accordance with the prevailing measurement result. An example of such an interface is the 4-20 mA industrial loop, where the current is regulated between 4 and 20 mA, depending on the measurement result. Alternatively, the system 100 may communicate wirelessly with the control station using e.g. a Wireless HART protocol, and use a local power supply (not shown) with batteries or means of scavenging energy for autonomous operation.

The interface 124 here includes power management circuitry, including a power storage (not shown) for storing power during periods when the microwave unit is inactive, thereby enabling higher power consumption during periods when the transceiver 118 is active (i.e. during measurement). With such power management, lower average power consumption may be achieved, while still allowing short periods of higher power consumption. The power storage (not shown) may include a capacitor, and may be restricted by space requirements as well as intrinsic safety requirements (applying when the system 100 is arranged in the hazardous zone of a tank with explosive or flammable contents)

Although being shown as separate blocks in FIG. 1, several of the transceiver 118, the processing circuitry 122, memory 120 and the interface 124 may be provided on the same circuit board, or even in the same circuit.

The elements of the transceiver 118 are typically implemented in hardware, and form part of an integrated unit normally referred to as a microwave unit. The processing circuitry may be incorporated in hardware as electronic circuits or partly as software components executed by microprocessors. At least some portions of the processing circuitry 122 are typically embodied by software modules executed by an embedded processor. The invention is not restricted to this particular realization, and any implementation found suitable to realize the herein described functionality may be contemplated.

Figure 2:
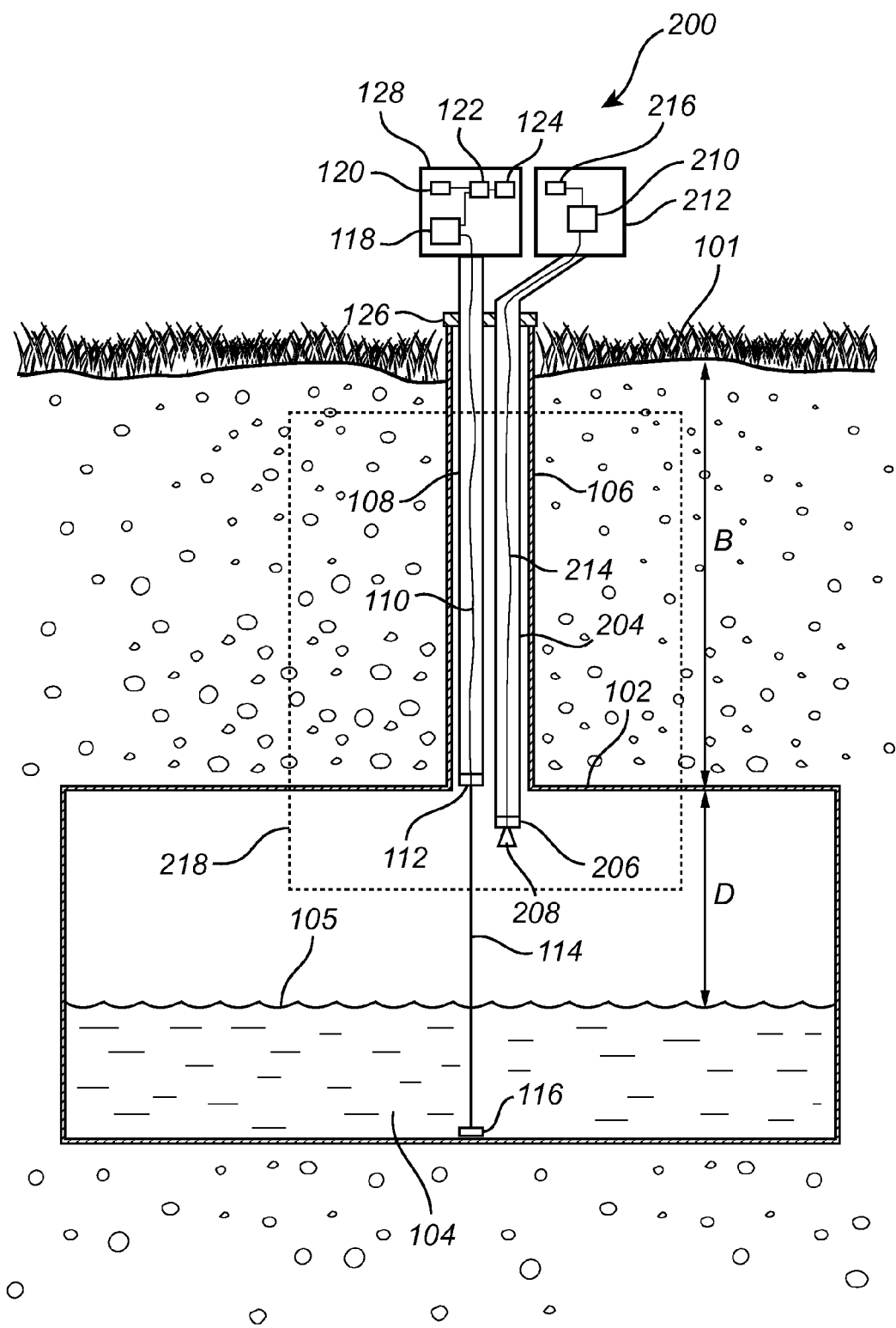
FIG. 2 is a schematic representation of another gauging system according to a second embodiment the present invention.

Now referring to FIG. 2 another system 200 according to the present invention is shown. Compared to the system 100 shown in FIG. 1, the system 200 further comprises a level switch, preferably functionally independent from the guided wave radar level gauge, and arranged to determine when the filing level exceeds a predetermined filling. The level switch here includes a level surface contact detector 208 configured to detect contact with the surface 105, and provide a measurement signal indicative of surface contact. The surface contact detector 208 is connected to a control unit 210, through an electrical connection line 214. The control unit 210 is configured to receive the measurement signal and determine contact with the surface 105 based on the measurement signal. A second rigid extension member, here again a tubular member in the form of a cylindrical metal tube 204, is arranged along the tube 108, and a first end of the tube 204 is connected to the control unit 210, and a second end of the tube 204 connected to the surface contact detector 208. A detector sealing 206 is arranged in the second end, to prevent tank content from entering the tube 204. The electrical connection line 214 is arranged in the tube 204. The control unit 210 is mounted together with an interface 216 in an electronics unit 212 on top of the nozzle. The interface 216 connected to the control unit 210 works on the same principles as described above for the interface 124 connected to the processing circuitry 122.

In a typical measuring situation the filling level in the tank 102 will fluctuate due to amount of the product 104 being pumped in and out of the tank 102. When the filling level reaches a high enough level, the surface 105 of the product 104 will reach the surface contact detector which will provide a measurement signal which then indicates contact with the surface 105. The control unit 210 receiving the measurement signal will determine if contact with the surface 105 occurs or not.

By the above statement it should be understood that the surface contact detector 208 may be a device which changes a characteristic property due to contact with the surface 105. For example a mechanical or acoustic resonator which changes its resonance frequency due to contact, or a detector changing its resistance or the like. In some of the above examples, the control unit 210 will provide an initial signal, and the surface contact detector 208 will provide i.e. return a measurement signal which indicates if there is contact with the surface 105 or not. The surface contact detector 208 and the guided wave radar level gauge will advantageously measure concurrently, thereby providing two separate measurements which provide a more robust and safe gauging system where an alarm or automated stop may be used to prevent an overfill situation. The surface contact detector 208, the electrical connection line 214 and the control unit 210 may be known collectively as a level switch.

As mentioned, the nozzle 106 is typically rather narrow. In order to accommodate both the electronics unit 128 and the electronics unit 212, the exterior end of one of the tubes 108, 204 may be bent away from the other. In the illustrated example, the tube 204 is bent away from the tube 108, to provide sufficient space for the electronics unit 212.

Figure 3:
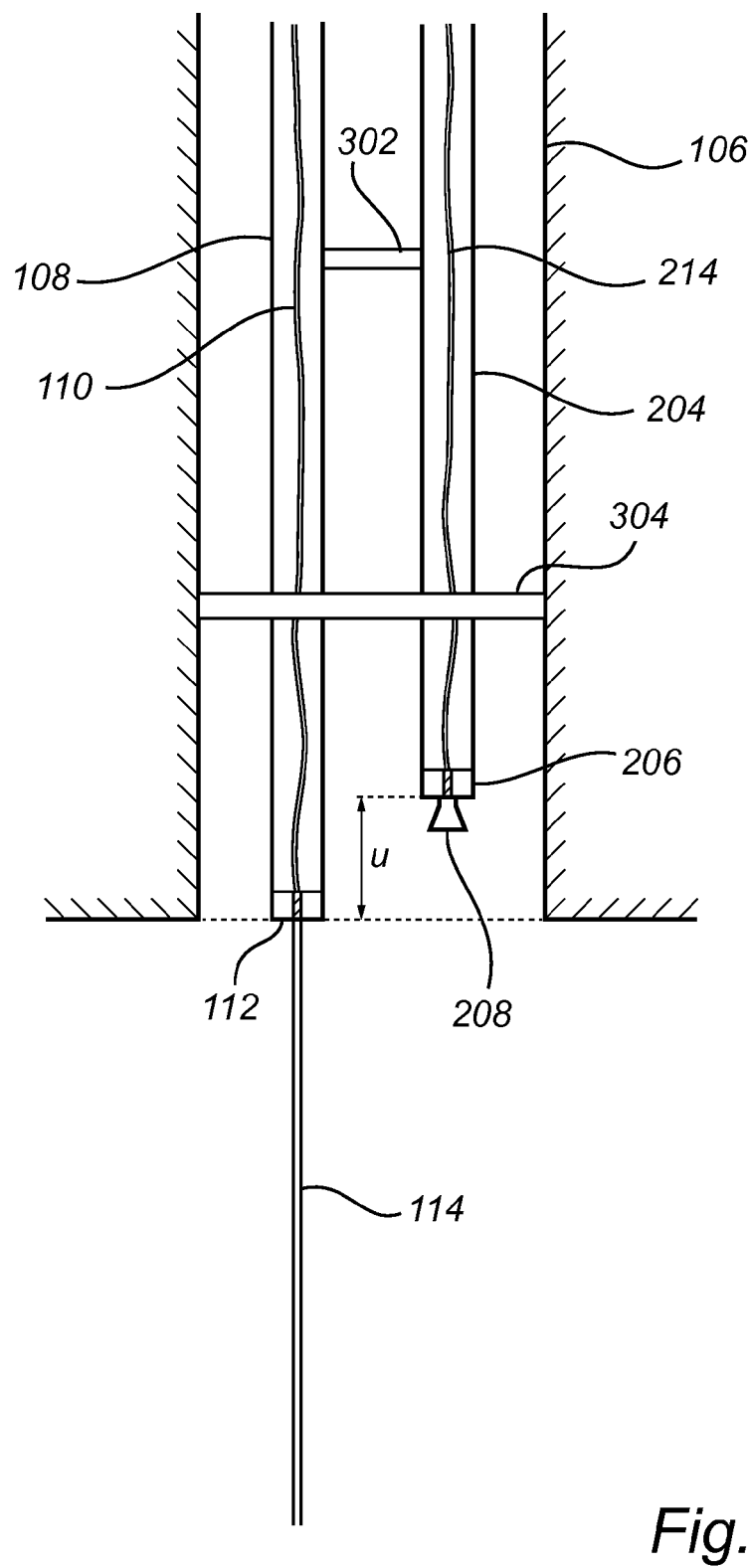
FIG. 3 is a schematic view of the area marked by a dashed line in FIG. 2 at the opening of the nozzle into the tank, according to various embodiments of the present invention.

In FIG. 3 the area 218 marked by the dashed line of FIG. 2 is shown in more detail. The more detailed view shows a variant where a support element 302 is attached to either the first 108 or second tubular member 204. The support element 302 is configured to keep a predetermined distance between the tubes 108, 204 to prevent mechanical contact. Mechanical contact between the two tubes 108, 204 could be harmful to the tubes 108, 204, the nozzle 106, the probe 114, the surface contact detector 208, or the sealings 112, 206. Therefore, it may even be prudent to include at least one support element 304 which is also configured to keep a distance between the tubes 108, 204 and the nozzle 106. The support element 302 may be embodied by clamping elements in either end for attachment to the tubes 108, 204 and a stiff elongated rod, or the like, attached to the clamping elements in order to keep a predetermined distance between them. Another example would be a support element 302 shaped as box-end wrench, also known as a ring spanner, which is sleeved onto the tubes 108, 204. The support element 304 also configured to keep a predetermined distance to the nozzle may also be shaped as a ring spanner sleeved onto the tubes 108, 204, and further having extensions which extend radially towards the nozzle in order to keep the predetermined distance. One way to shape the extensions of the support element 304 would thus be to shape the support element 304 as a disk which is complimentary shaped to the nozzle 106 and with holes corresponding to the tubes 108, 204 in order to allow the disk-shaped support element 304 to be sleeved onto the tubes 108, 204.

Further, note that in FIG. 3 the tube 204 is shorter than the tube 108. The difference in length between the tubes 108, 204, means that the surface contact detector 208 will be arranged above the start of the probe 114 which is indicated by the distance u. Arranging the surface contact detector 208 a distance u above the opening from the nozzle 106 into the tank 102 will enable the surface contact detector to act as a safety, for when the surface 105 of the product 104 reaches all the way up into the nozzle 106. By providing a surface contact detector 208 that is arranged in line with the opening of the nozzle 106 into the tank 102 a pumping action which fills the tank 102 may be halted before reaching into the nozzle 106 if the guided wave radar level gauge system does not detect the surface. There also is the possibility to arrange the surface contact detector 208 below the start of the probe 114 i.e. below the transition from the sealing 112 to the probe 114, as is indicated in FIG. 2 where the tube 204 extends further than the tube 108. A surface contact detector 208 arranged below the start of the probe 114 may ensure detection prior to the liquid product reaching the sealings 112, 206. Thereby, unnecessary strain or damage to the sealings 112, 206 is reduced. Thus the service life of the system 200 may be prolonged by keeping the seal intact for a larger time period.

Figure 4:
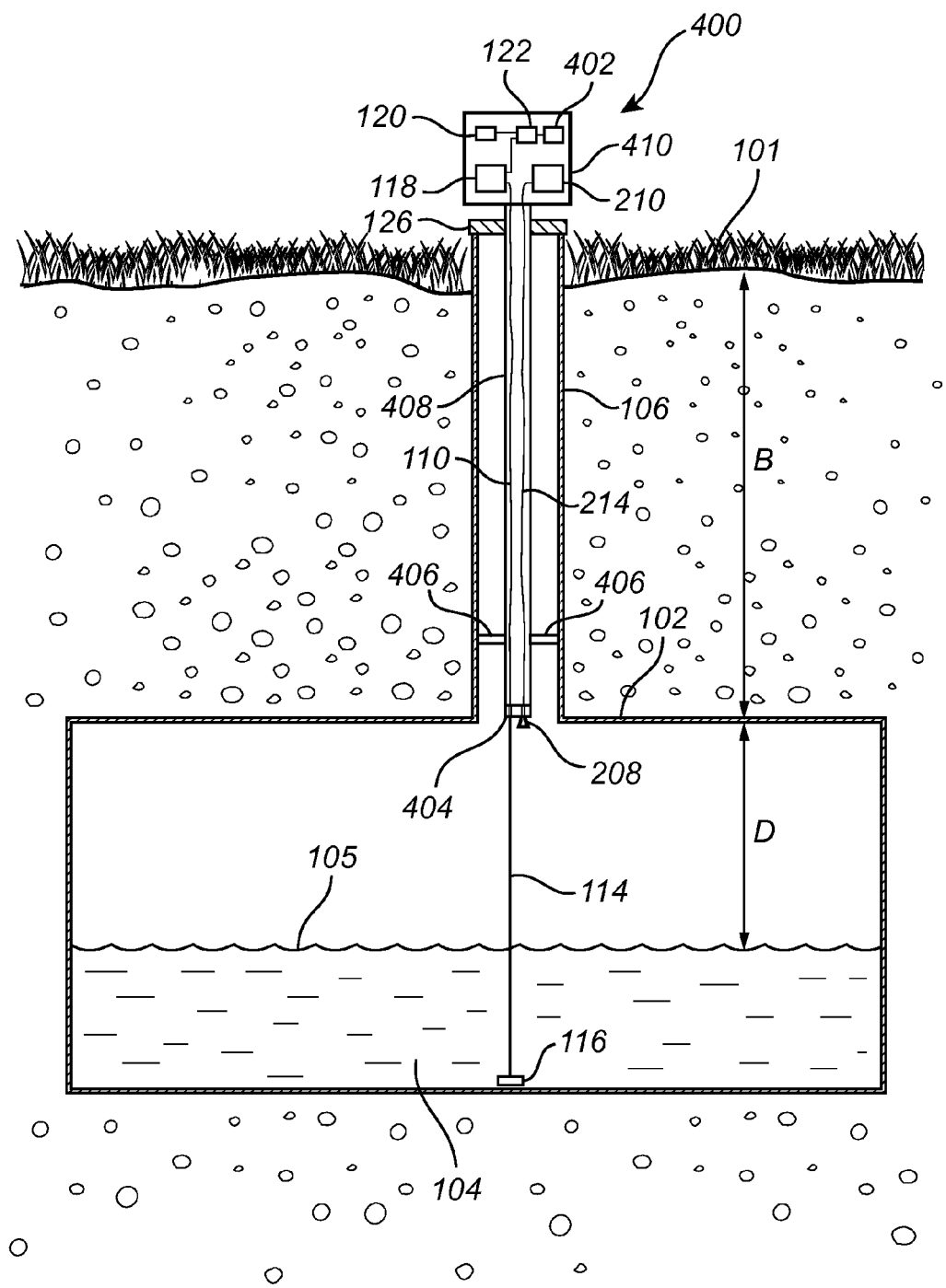
FIG. 4 is a schematic representation of a gauging system according to a further embodiment of the present invention.

In FIG. 4 there is shown another embodiment of a gauging system 400 according to the present invention. In this embodiment, there is only one rigid extension member, here a single tubular member in the form of a cylindrical metal tube 408. Thus, the microwave transmission line 110 and electrical connection line 214 are both arranged within the tube 408. A first end of the tube 408 is connected to an electronics unit 410 mounted on top of the nozzle. Further, both the control unit 210 and the processing circuitry 122 is now connected to the same interface 402. The interface 402 is thus accordingly tuned to allow for communication for both devices. At the second end of the single tubular member there is a sealing 404 arranged, to prevent tank content from entering the tube 408. The sealing may be of similar type as that described above.

The system 400 also comprises at least one support element 406 configured to keep a predetermined distance between the tube 408 and the nozzle 106.

Additionally, even though the invention has been described with reference to specific exemplifying embodiments thereof, many different alterations, modifications and the like will become apparent for those skilled in the art. Likewise, software implementations could be accomplished with standard programming techniques with rule based logic and other logic to accomplish the various connection steps, processing steps, comparison steps and decision steps. Variations to the disclosed embodiments can be understood and effected by the skilled addressee in practicing the claimed invention, from a study of the drawings, the disclosure, and the appended claims. Furthermore, in the claims, the word "comprising" does not exclude other elements or steps, and the indefinite article "a" or "an" does not exclude a plurality.

What is claimed is:

1. A gauging installation mounted in a tank for holding liquids, comprising:
  a nozzle providing access to an interior of said tank, said nozzle having a tank end connected to an opening in a tank wall, and a distal end at a distance from said tank, said distance being greater than 0.5 meter, and
  a gauging system including:
    a tank seal arranged in said distal end of said nozzle and configured to separate a tank interior from a tank exterior;
    a first rigid extension member extending from said tank seal and providing an interior probe mounting position located proximal to said tank end of said nozzle;
    a guided wave radar level gauge for measurement of a distance to a surface of a product in said tank, said guided wave radar level gauge including:
      a transceiver configured to transmit an electromagnetic transmit signal and to receive an electromagnetic echo signal;
      processing circuitry connected to said transceiver and configured to determine said distance based on a relationship between said electromagnetic transmit signal and said electromagnetic echo signal;
      a probe mounted in said probe mounting position and extending into said tank, said probe configured to guide said electromagnetic transmit signal from said transceiver towards said product inside said tank, and to return said electromagnetic echo signal resulting from a reflection of said electromagnetic transmit signal by a surface of said product;
      a microwave transmission line having a first end connected to said transceiver; and
      a probe sealing arrangement providing a sealed connection of said probe to a second end of said transmission line.

2. The gauging installation according to claim 1, wherein said distance is greater than 1 m.

3. The gauging installation according to claim 1, wherein an inner diameter of said nozzle is less than 4 inches.

4. The gauging installation according to claim 1, further comprising at least one support element, wherein said at least one support element is arranged to keep at least a predetermined distance between said rigid extension member and an inner wall of said nozzle.

5. The gauging installation according to claim 1, further comprising a level switch, functionally independent from said guided wave radar level gauge and arranged to determine when said surface exceeds a predetermined filling level.

6. The gauging installation according to claim 5, wherein said level switch comprises;
  a surface detector arranged in the tank interior and configured to detect said surface, and provide a measurement signal indicative of said surface;
  a control unit arranged in the tank exterior and configured to receive said measurement signal and, based on said measurement signal, determine if said surface has exceeded a predetermined filling level;
  an electrical connection line having a first end connected to said control unit, and
  a detector sealing arrangement providing a sealed connection of said surface detector to a second end of said electrical connection line.

7. The gauging installation according to claim 6, wherein said surface detector is mounted in the probe mounting position.

8. The gauging installation according to claim 7, wherein the first rigid extension member is tubular, and wherein said electrical connection line is arranged inside said first rigid, tubular extension member.

9. The gauging installation according to claim 6, further comprising: a second rigid extension member extending from said tank seal to provide an interior detector mounting position, wherein said surface detector being mounted in said interior detector mounting position.

10. The gauging installation according to claim 9, wherein said detector mounting position is located below the probe mounting position.

11. The gauging installation according to claim 9, wherein the detector mounting position is located above the probe mounting position.

12. The gauging installation according to claim 9, further comprising at least one support element arranged between said first and second rigid extension members to ensure at least a predetermined distance between said first and second rigid extension members.

13. The gauging installation according to claim 9, wherein the second rigid extension member is tubular, and wherein said electrical connection line is arranged inside said second rigid, tubular extension member.

14. The gauging installation according to claim 6, wherein said transceiver, said processing circuitry and said control unit are housed in one single electronics unit.

15. The gauging installation according to claim 1, wherein the first rigid extension member is tubular, and wherein said transmission line is arranged inside said first rigid, tubular extension member.

16. The gauging installation according to claim 1, wherein the microwave transmission line has an impedance matching an impedance of said transceiver.

17. The gauging installation according to claim 1, further comprising a temperature sensor, arranged to detect a temperature in a position along said first extension member.

18. A gauging system, intended to be mounted in a tank nozzle having a length of at least 0.5 meter, said gauging system comprising:
  a tank seal configured to be mounted in an upper opening of said nozzle, said tank seal configured to separate a tank interior from a tank exterior;
  a first rigid extension member extending from said tank seal and providing an interior probe mounting position at a distance from said tank seal, said first extension member having a length of at least 0.5 meter;
  a guided wave radar level gauge for measurement of a distance to a surface of a product in said tank, said guided wave radar level gauge including:
    a transceiver configured to transmit an electromagnetic transmit signal and to receive an electromagnetic echo signal;
    processing circuitry connected to said transceiver and configured to determine said distance based on a relationship between said electromagnetic transmit signal and said electromagnetic echo signal;
    a probe mounted in said probe mounting position and configured to guide said electromagnetic transmit signal from said transceiver towards said product inside said tank, and to return said electromagnetic echo signal resulting from a reflection of said electromagnetic transmit signal by a surface of said product;

a microwave transmission line having a first end connected to said transceiver; and a probe sealing arrangement providing a sealed connection of said probe to a second end of said transmission line.

19. The gauging system according to claim 18, wherein said first rigid extension member has a length of at least 1 meter.

20. The gauging system according to claim 18, further comprising at least one support element, wherein said at least one support element is adapted to keep at least a predetermined distance between said first rigid extension member and an inner wall of said nozzle, when said gauging system is mounted in said nozzle.

21. The gauging system according to claim 18, further comprising a level switch, functionally independent from said guided wave radar level gauge and arranged to determine when said surface exceeds a predetermined filling level.

22. The gauging system according to claim 21, wherein said level switch comprises;

a surface detector arranged in the tank interior and configured to detect said surface, and provide a measurement signal indicative of said surface;

a control unit arranged in the tank exterior and configured to receive said measurement signal and, based on said measurement signal, determine if said surface has exceeded a predetermined filling level; and an electrical connection line having a first end connected to said control unit, and a detector sealing arrangement providing a sealed connection of said surface detector to a second end of said electrical connection line.

23. The gauging system according to claim 22, wherein said surface detector is mounted in said probe mounting position.

24. The gauging system according to claim 23, wherein the first rigid extension member is tubular, and wherein said electrical connection line is arranged inside said first rigid, tubular extension member.

25. The gauging system according to claim 22, further comprising: a second rigid extension member extending from said tank seal to provide an interior detector mounting position, wherein said surface detector is mounted in said interior detector mounting position.

26. The gauging system according to claim 25, wherein the second rigid extension member is shorter than the first rigid extension member.

27. The gauging system according to claim 25, wherein the second rigid extension member is longer than the first rigid extension member.

28. The gauging system according to claim 25, further comprising at least one support element arranged between said first and second rigid extension members to ensure at least a predetermined distance between said first and second rigid extension members.

29. The gauging system according to claim 25, wherein the second rigid extension member is tubular, and wherein said electrical connection line is arranged inside said second rigid, tubular extension member.

30. The gauging system according to claim 22, wherein said transceiver, said processing circuitry and said control unit are housed in one single electronics unit.

31. The gauging system according to claim 18, wherein the first rigid extension member is tubular, and wherein said transmission line is arranged inside said first rigid, tubular extension member.

32. The gauging system according to claim 18, wherein the microwave transmission line has an impedance matching an impedance of said transceiver.

33. The gauging system according to claim 18, further comprising a temperature sensor, arranged to detect a temperature in a position along said first extension member.

34. A method for measuring a distance to a surface of a product in a tank, said tank having a nozzle with a tank end connected to an opening in a tank wall, and a distal end, wherein a distance between said tank end and said distal end is greater than 0.5 m, said method comprising the steps of:

feeding an electromagnetic transmit signal from a transceiver through a tank seal mounted in the distal end of said nozzle;

guiding said electromagnetic transmit signal along a microwave transmission line from said tank seal to a probe mounted in a probe mounting position proximal to said tank end of said nozzle;

feeding said electromagnetic transmit signal through a probe sealing arrangement to said probe extending into the tank, guiding said electromagnetic transmit signal along said probe, returning an electromagnetic echo signal resulting from a reflection of said electromagnetic transmit signal by a surface of said product;

receiving said electromagnetic echo signal in said transceiver; and determining said distance based on a relationship between said electromagnetic transmit signal and said electromagnetic echo signal.

35. The method according to claim 34, further comprising the steps of:

detecting said surface;

providing a measurement signal in response to said detecting;

guiding said measurement signal along an electrical connection line extending through the nozzle to a control unit; and determining, based on said measurement signal, if said surface has exceeded a predetermined filling level surface.

* * * * *